US006934811B2

(12) United States Patent
Cho

(10) Patent No.: US 6,934,811 B2
(45) Date of Patent: Aug. 23, 2005

(54) MICROPROCESSOR HAVING A LOW-POWER CACHE MEMORY

(75) Inventor: Sang-Yeun Cho, Yongin-shi (KR)

(73) Assignee: Samsung Electronics, Co., Ltd. (KR)

( * ) Notice: Subject to any disclaimer, the term of this patent is extended or adjusted under 35 U.S.C. 154(b) by 219 days.

(21) Appl. No.: 10/094,770

(22) Filed: Mar. 7, 2002

(65) Prior Publication Data

US 2002/0194430 A1 Dec. 19, 2002

(30) Foreign Application Priority Data

Jun. 16, 2001 (KR) ........................................ 2001-34186

(51) Int. Cl.$^7$ ............................................ G06F 12/08
(52) U.S. Cl. ........................ 711/138; 711/137; 711/125; 711/126; 711/128; 711/144
(58) Field of Search ................. 711/137–138, 125–126, 711/128, 144; 713/300

(56) References Cited

U.S. PATENT DOCUMENTS

| 5,455,925 | A |   | 10/1995 | Kitahara et al. | ............ | 395/449 |
| 5,632,038 | A |   | 5/1997 | Fuller | ........................ | 395/750 |
| 5,752,045 | A | * | 5/1998 | Chen | ........................ | 713/322 |
| 5,765,002 | A | * | 6/1998 | Garner et al. | ............... | 713/300 |
| 5,809,326 | A | * | 9/1998 | Nogami | ....................... | 712/32 |
| 5,809,531 | A |   | 9/1998 | Brabandt | ...................... | 711/141 |
| 5,845,309 | A |   | 12/1998 | Shirotori et al. | ............... | 711/3 |
| 5,870,574 | A | * | 2/1999 | Kowalczyk et al. | ........ | 712/206 |
| 5,870,616 | A | * | 2/1999 | Loper et al. | ................. | 713/324 |
| 5,974,505 | A | * | 10/1999 | Kuttanna et al. | ........... | 711/118 |
| 6,345,336 | B1 | * | 2/2002 | Takahashi | ................... | 711/125 |
| 6,535,959 | B1 | * | 3/2003 | Ramprasad et al. | ........ | 711/125 |
| 6,560,679 | B2 | * | 5/2003 | Choi et al. | ................... | 711/138 |
| 6,718,439 | B1 | * | 4/2004 | Jayavant | ...................... | 711/136 |
| 2001/0029571 | A1 | * | 10/2001 | Shibayama | ................. | 711/118 |

OTHER PUBLICATIONS

Bellas, N., et al., "Architectural and Compiler Techniques for Energy Reduction in High–Performance Microprocessors," IEEE Transactions on VLSI Systems, vol. 8, No., 3, Jun. 2000, pp. 317–326.

Ghose, et al., "Reducing Power in Superscalar Processor Caches Using Subbanking Multiple Line Buffers and Bit–Line Segmentation," Department of Computer Science, State University of New York, pp. 70–75.

Bajwa, R., et al., "Instruction Buffering to Reduce Power in Processors for Signal Processing," IEEE Transactions on VLSI Systems, vol. 5, No. 4, Dec. 1997, pp. 417–424.

* cited by examiner

Primary Examiner—Matthew D. Anderson
Assistant Examiner—Hetul Patel
(74) Attorney, Agent, or Firm—Mills & Onello LLP

(57) ABSTRACT

A cache is provided which has low power dissipation. An execution engine generates a sequential fetch signal indicating that data required at a next cycle is stored at a next location of just previously used data. A line reuse buffer is provided which stores data that is stored in a data memory of the cache and is in the same cache line as data just previously used by the execution engine. In the case where the sequential fetch signal is received and data required according to a memory request signal is stored in the same cache line of the data memory as the just previously used data, a cache controller fetches data from the line reuse buffer and controls the cache so as to stay in a stand-by mode.

41 Claims, 7 Drawing Sheets

MICROPROCESSOR HAVING A LOW-POWER CACHE MEMORY

This application relies for priority upon Korean Patent Application No. 2001-34186, filed on Jun. 16, 2001, the contents of which are herein incorporated by reference in their entirety.

FIELD OF THE INVENTION

The present invention generally relates to a method and a device for processing data requests with regard to a memory in a microprocessor, and, more specifically, to a cache that dissipates low power.

BACKGROUND OF THE INVENTION

Cache memories can be used to reduce memory access time in response to a speed difference between microprocessors and memories. The cache memory operates based on two theories, one being temporal locality and the other one being spatial locality. Temporal locality means that a previously accessed memory address is accessed again in a short time. Spatial locality means that an address adjacent to an accessed memory address is accessed. In order to improve a processor's performance, recently, a large-capacity cache memory has been integrated on a single chip together with a processor core. For this reason, an area occupied by an on-chip cache memory is increased gradually. For example, caches in the StrongARM 110 processor occupy about 70% of the total chip area.

U.S. Pat. No. 5,455,925 discloses a device for maintaining coherency of data stored in external and internal cache memories, and U.S. Pat. No. 5,809,531 discloses a computer system for executing a program using an internal cache without accessing an external RAM.

FIG. 1 shows a block diagram of a microprocessor unit (hereinafter, referred to as "MPU") in which level two (hereinafter, marked by "L2") caches and a tag are embedded. If L2 caches are embedded in the MPU, reduction of line loading and power dissipation and improvement of an operation speed are expected. As a hit ratio is increased by use of a multi-way set scheme, an efficient and simple structure of the MPU can be accomplished. The MPU in FIG. 1 includes eight L2 caches each constituted of SRAM, one TAG, and an MPU core. An address and data are transferred between the L2 caches and the MPU core, and the address is transferred between the TAG and the MPU core. The TAG sends a set selection signal to the L2 caches. In the case of reading data, the TAG compares an address generated from the MPU core with a previous address and provides the set selection signal to the respective L2 caches. In each L2 cache, all sets of word lines are selected by the address and then data corresponding to the set selection signal from the TAG is read out.

As illustrated in FIG. 1, if a cache memory is integrated on a chip together with a processor core, the cache memory often consumes a significant portion of the power dissipated by a processor. For this reason, reducing the power dissipated by an on-chip cache is helpful to reduce the total power dissipated by the processor. In particular, in the case of an instruction cache, it is accessed every cycle while a program is being executed. This means that the power dissipation due to a memory access is significant. Accordingly, it is required to reduce the power dissipated by the cache memory integrated on a single chip together with the MPU.

SUMMARY OF THE INVENTION

It is an object of the present invention to provide a low-power cache without increasing circuit complexity of the cache.

It is another object of the prevent invention to provide a microprocessor having a low-power cache.

A microprocessor in accordance with the invention includes an execution engine and a cache. The execution engine generates a memory request signal and a sequential fetch signal. The memory request signal requests data fetch from a main memory and includes position information of data, requested according to the memory request signal, in the main memory. The sequential fetch signal is generated when the requested data is stored at a position of the main memory just next to or adjacent to data that is used immediately previously by the execution engine. The cache includes a cache controller, a data memory, a tag memory, a register, and a data path. The data memory stores data of the main memory by a cache line unit consisting of plural words. The tag memory stores a tag corresponding to position information, related to the main memory, of data stored in the data memory. The register temporarily stores data transferred from the data memory. The data path interconnects the data memory and the execution engine. Where the execution engine generates the sequential fetch signal and the requested data is stored on the same cache line of the data memory as the data used immediately previously by the execution engine, the cache controller controls the data and tag memories so as to enter a low-power stand-by mode.

In one embodiment, the data and tag memories enter the low-power stand-by mode, the cache controller controls the data path so that the requested data is transferred from the register to the execution engine.

In one embodiment, the data memory and the register constitute a latch memory.

In one embodiment, the cache is either one of a data cache and an instruction cache.

In one embodiment, the register is constituted of a line reuse buffer that stores data stored in the same cache line of the data memory as the data used just previously by the execution engine.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

The preferred embodiments of the invention will be more fully described with reference to the attached drawings. The present invention will be described with reference to an instruction cache, but it will be appreciated that the invention can be applied to other types of cache memories such as data caches.

Figure 1:
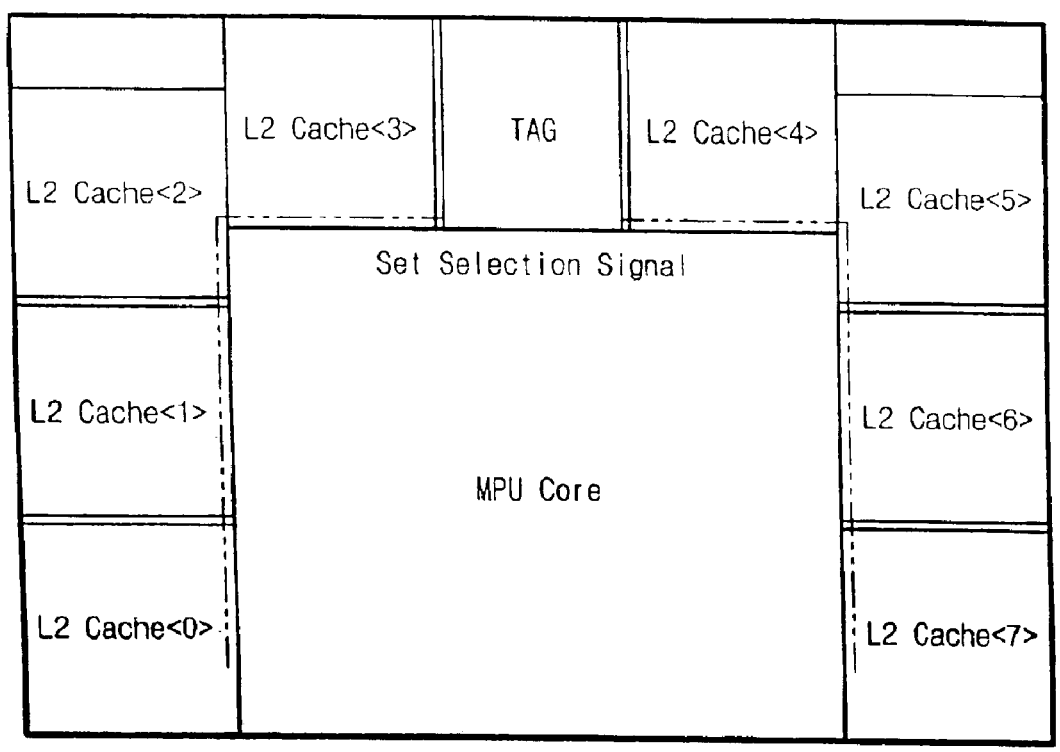
FIG. 1 is a block diagram of a microprocessor in which eight level two caches are embedded.
Figure 2:
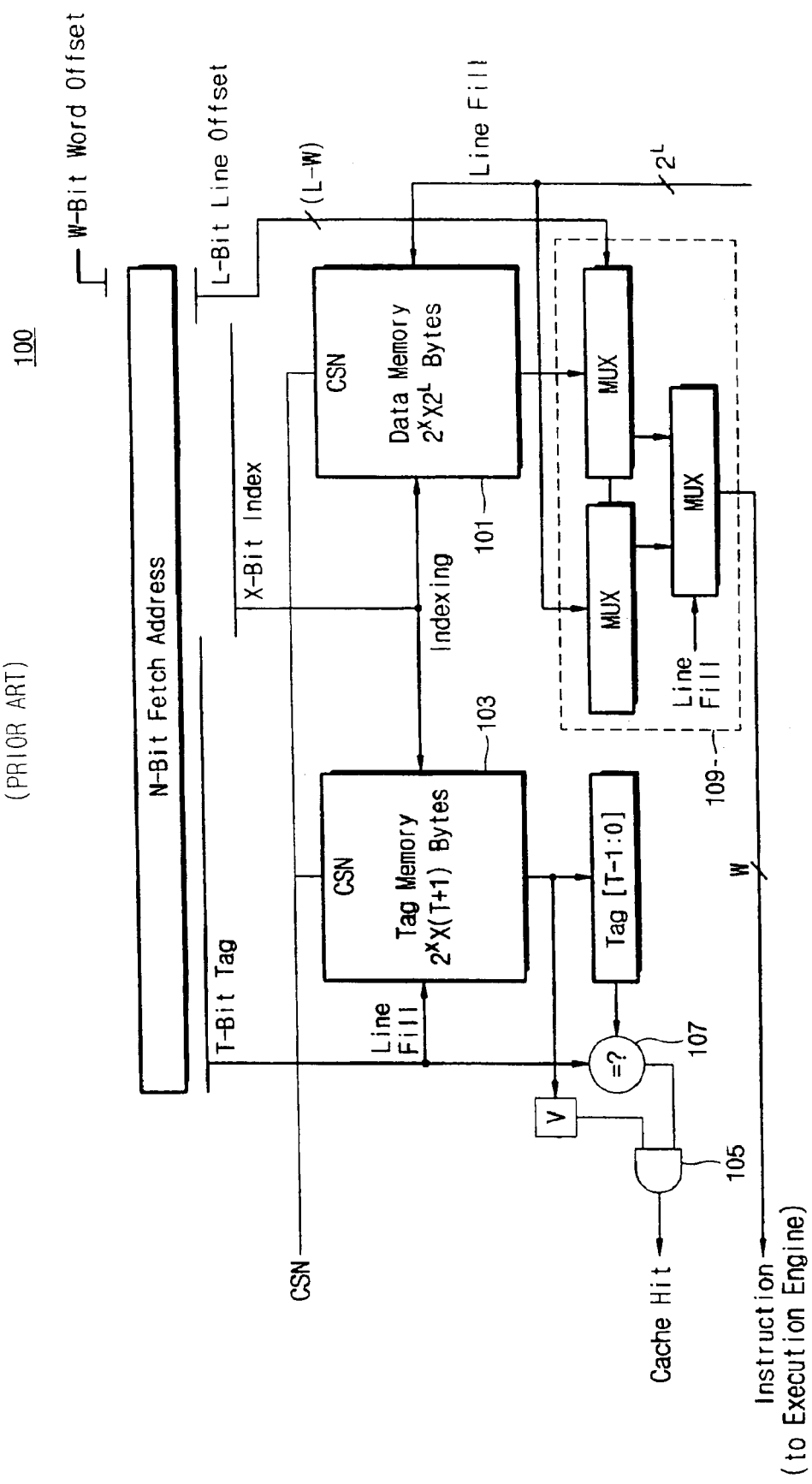
FIG. 2 is a block diagram of a conventional cache.

FIG. 2 is a block diagram that shows a conventional cache structure. Referring to FIG. 2, the conventional instruction cache includes a data memory 101 for storing contents in a main memory, a tag memory 103 for storing a tag address indicating the instructions that are presently stored in a cache, a cache controller (not shown) for controlling an overall operation of the cache, and a data path for interconnecting the constituents under the control of the cache controller for mutual data transmission. Although an execution engine and a main memory are not illustrated in FIG. 2, mutual connection relationship between the execution engine, the main memory, and the instruction cache is well known.

A cache mapping method determines how a main memory address for required data and a tag stored in a tag memory are associated. This embodiment will be described in connection with a direct mapping method, but a fully associative mapping method or a set associative mapping method can be used. The data path consists of a plurality of multiplexers 109 and a bus. The cache controller controls a mutual connection relationship between the data memory 101, the main memory (not shown), and the execution engine (not shown) so that data transfer may be accomplished.

An operation of the cache is partitioned into a read cycle of a cache hit and a write or processing cycle of a cache miss. When accessing a cache 100, an execution engine transfers into the cache 100 an address of a main memory (referred to as "a main memory address) related to requested data. The main memory address is indicated by "N-bit fetch address" in FIG. 2. The N-bit fetch address consists of a T-bit tag, an X-bit index, and an L-bit line offset including a W-bit word offset. The cache 100 accesses the data memory 101 and the tag memory 103 using the X-bit index of the N-bit fetch address. If a tag read out from the tag memory 103 is equal to the T-bit tag of the N-bit fetch address and a cache entry is valid, a cache hit occurs. A tag comparator 107 judges whether an address is equal to the T-bit tag of the N-bit fetch address. If equal, the tag comparator 107 outputs a '1' value. An N-bit comparator can be realized using N exclusive-OR gates and a NOR gate with N fan-in's. Whether the cache entry is valid is judged referring to a valid bit V being a 1-bit value. In the case where the cache entry is valid, the valid bit V has '1'. An AND gate 105 is supplied with an output of the tag comparator 107 and the valid bit V value. When the output of the tag comparator 107 is '1', a cache hit occurs. In the case of the cache hit, the execution engine uses the data read from the data memory 101 without latency. For this, the cache controller controls the data path so that the data memory 101 and the execution engine may be interconnected.

When the output value of the AND gate 105 is '0', a cache miss occurs. At this time, the cache controller generates control signals so that the execution engine waits until valid data is prepared, with accessed data being ignored. In order to fetch valid data, the cache controller accesses a lower memory (commonly, referred to as "a main memory") at the outside of the cache 100 through interface logic, reads requested data, and stores the data read from the main memory in the data memory 101. At this time, a tag corresponding to the fetched data is stored in the tag memory 103. The above-described operations are sequentially performed in a miss processing cycle. Data, which is read out from the main memory and is to be supplied to the execution engine, is first stored in the data memory 101 and then is again read out from the data memory 101. On the other hand, the data is able to be stored in the data memory 101 while transferred to the execution engine.

In the case of accessing, in a cache-hit cycle, a cache entry accessed at a previous cycle, the present invention directly uses data in a register, which stores a cache entry accessed in a previous cycle, without accessing the data and tag memories. For this, the execution engine informs a cache the fact that in a next cycle, an instruction at a next location of presently accessed instruction is accessed. Such a fact is called "a sequential fetch". Examples of a processor providing such sequential fetch information are ARM9TDMI of ARM Limited and CalmRISC-32 of Samsung Electronics Co., Ltd.

Figure 3:
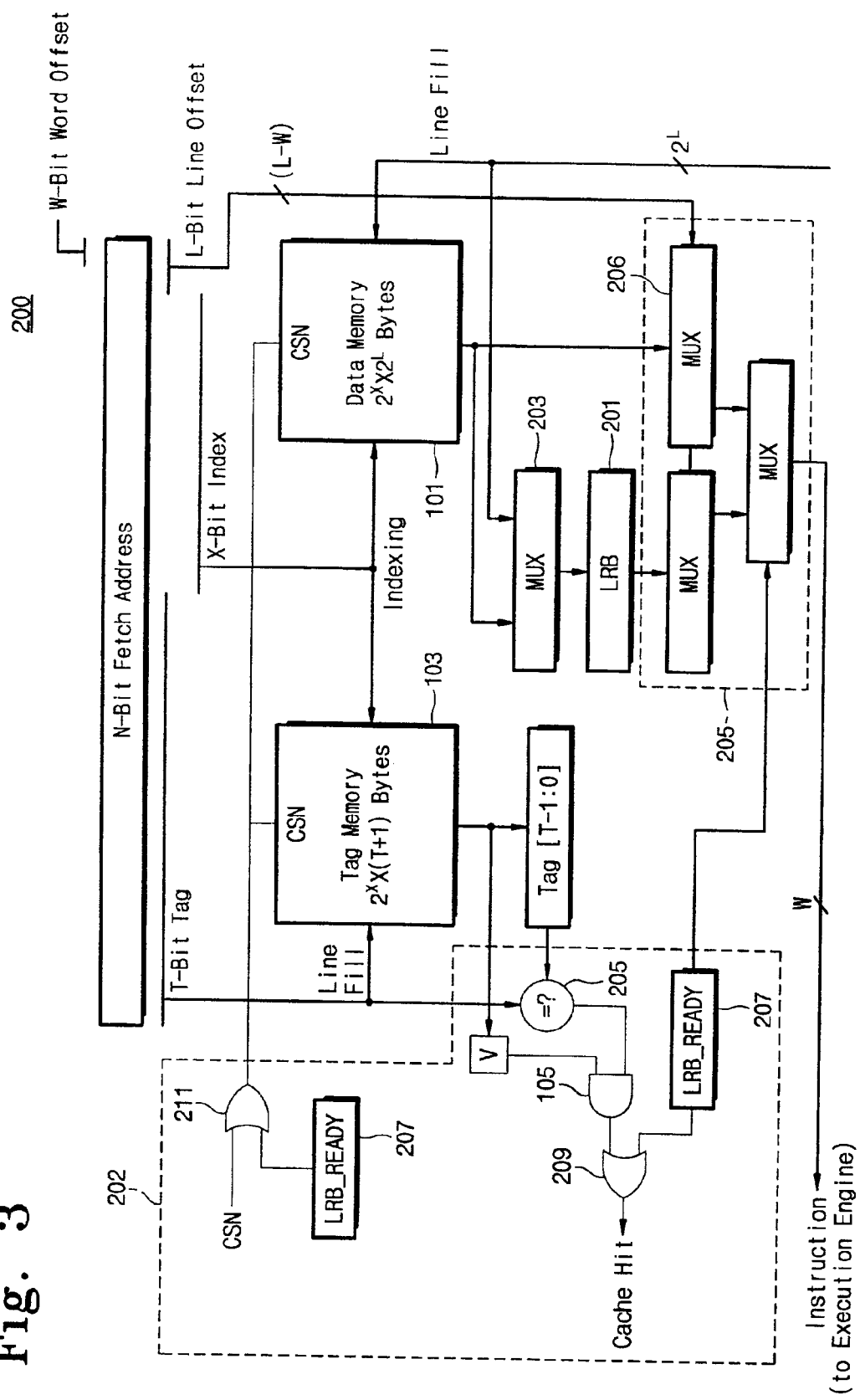
FIG. 3 is a block diagram of a cache according to an embodiment of the present invention.

FIG. 3 is a block diagram that shows an instruction cache structure according to a preferred embodiment of the present invention. As compared with the conventional instruction cache illustrated in FIG. 2, the instruction cache according to the present invention is distinguished, for example, in that a line reuse buffer 201 and a cache controller, or a portion of a cache controller, 202 for controlling an overall operation of the cache including the line reuse buffer 201 are provided in the cache. Provided further are a multiplexer 203 forming a data path related to the line reuse buffer 201, a state indication section 207 for indicating a state of the cache controller 202, a first OR gate 209, and a second OR gate 211 for generating a chip selection signal CSN for data and tag memories 101 and 103. Other constituents are identical with those illustrated in FIG. 2 and marked by the same reference numerals as FIG. 2. The cache controller 202 indicated by a dotted line in FIG. 3 is configured to comprise elements associated directly with the present invention. The item 202 in the dotted line may also indicate a portion of a cache controller.

The multiplexer 203 is controlled by the cache controller 202 and forms a data path so that data of a cache line unit outputted from the data memory 101 of the cache 200 or from the main memory may be stored in the line reuse buffer 201. When a new cache line of the data memory 101 is accessed and the data memory 101 is filled with a new cache line after processing a cache miss, contents of the new cache line are transferred to the execution engine and simultaneously stored in the line reuse buffer 201.

The state indication section 207 includes a flip-flip and stores a 1-bit value from the cache controller 202. When the state indication section 207 has '1', the chip selection signal CSN transitions from a logic low level to a logic high level, so that the data and tag memories 101 and 103 enter a low-power stand-by mode. That is, the data and tag memories 101 and 103 are suspended or disabled. Since a value stored in the state indication section 207 is supplied to one input of the OR gate 209, a cache hit always occurs when a value stored in the state indication section 207 is '1'. At this time when a value stored in the state indication section 207 is '1', a multiplexer forming the data path is controlled by the value in the state indication section 207, so that data stored in the line reuse buffer 201 is transferred to the execution engine.

The cache controller 202 is supplied with sequential fetch information provided from the execution engine and location information on a cache line of presently accessed data and determines whether the execution engine accesses a current cache line in the line reuse buffer 201. In the case where the execution engine accesses the cache line stored in the line reuse buffer 201, the cache controller 202 stores '1' in the state indication section 207. This enables the data and tag memories 101 and 103 to enter the low-power stand-by mode. At this time, data requested by the execution engine is fetched from the line reuse buffer 201.

In this embodiment, the line reuse buffer 201 according to the present invention can be used as a temporary preservation location for storing a cache line replaced from a cache.

Figure 4:
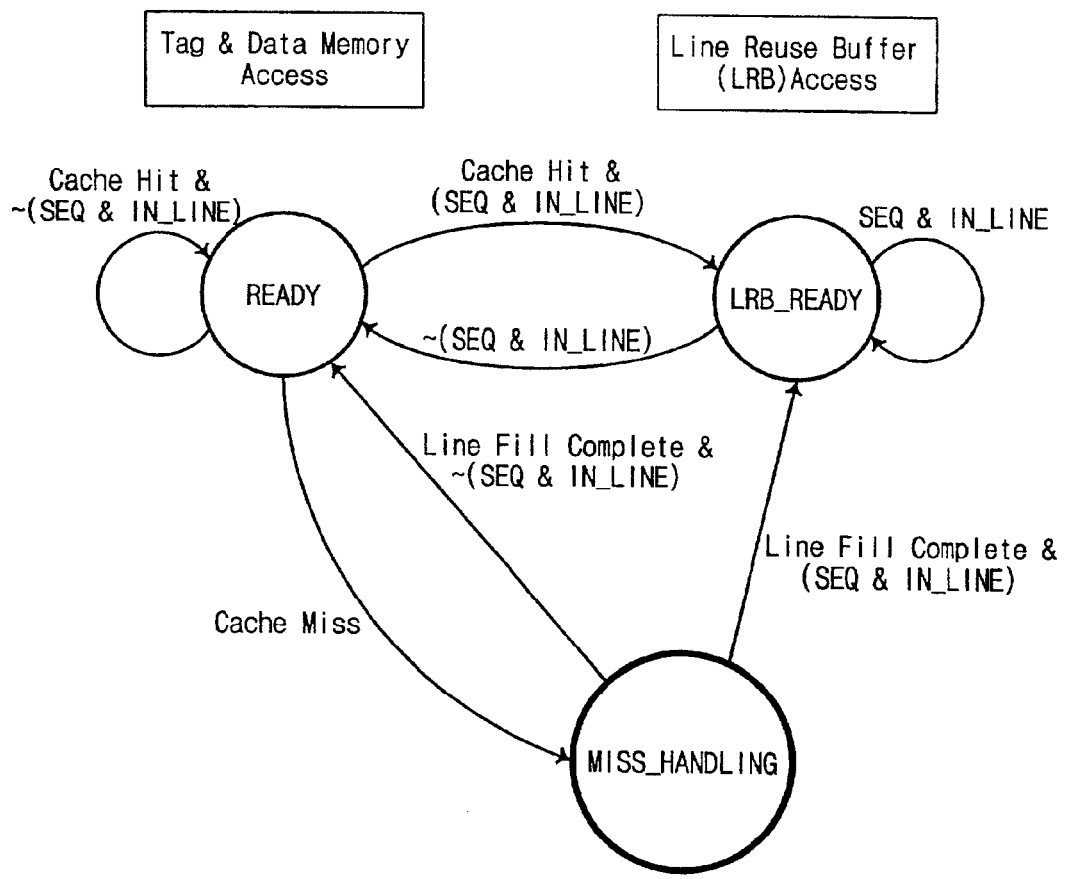
FIG. 4 is a state transition diagram of a cache controller illustrated in FIG. 3.

FIG. 4 is a state transition diagram of a cache controller according to the present invention. In FIG. 4, "READY" indicates a ready state for a general cache access operation, "LRB_READY" indicates a ready state for a line reuse buffer access operation, and "MISS_HANDLING" indicates a state for processing a cache miss. "~" and "&" indicate logic negation and logic product, respectively.

In the case in which a cache hit occurs in the "READY" state, that an execution engine informs that a next access is a sequential fetch (marked by "SEQ"), and that the next access is related to a presently accessed cache line, the cache controller transitions from the "READY" state to the "LRB_READY" state. If, in the case of the cache hit, the next access is not the sequential fetch (marked by "~SEQ") or the next access is not related to the same cache line (marked by "~IN_LINE"), the cache controller continues to stay in the "READY" state for the general cache access. If a cache miss occurs in the "READY" state, the cache controller transitions to the "MISS_HANDLING" state for processing the cache miss.

The "IN_LINE" condition, indicating that a next access is related to a presently accessed cache line, is that at least one of (L-W) bits used as selection information of a multiplexer 206 is '0'. That all (L-W) bits are '1' means that a word to be accessed next is related to a next cache line in the data memory 101 of the cache although it is adjacent to a presently accessed word.

Since the state indication section 207 has logically '1' in the "LRB_READY" state, a cache hit may occur without accessing a tag memory. At this time, data is read from the line reuse buffer 201, and the data and tag memories 101 and 103 enter a low-power stand-by mode. That is, the data and tag memories 101 and 103 are disabled (or suspended). In the "LRB_LEADY" state, if a next access is not the sequential fetch or is related to another cache line (marked by "~(SEQ & IN_LINE)"), the cache controller transitions again to the "READY" state. While a word to be accessed next is related to the sequential fetch with regard to a presently accessed word and exists in the same cache line, the cache controller stays in the "LRB_READY" state.

In the case of the sequential fetch and the same cache line after completing a cache line fill in the "MISS_HANDLING" state, the cache controller transitions to the "LRB_READY" state. In the case of no sequential fetch and no identical cache line, the cache controller transitions to the "READY" state.

Figure 5:
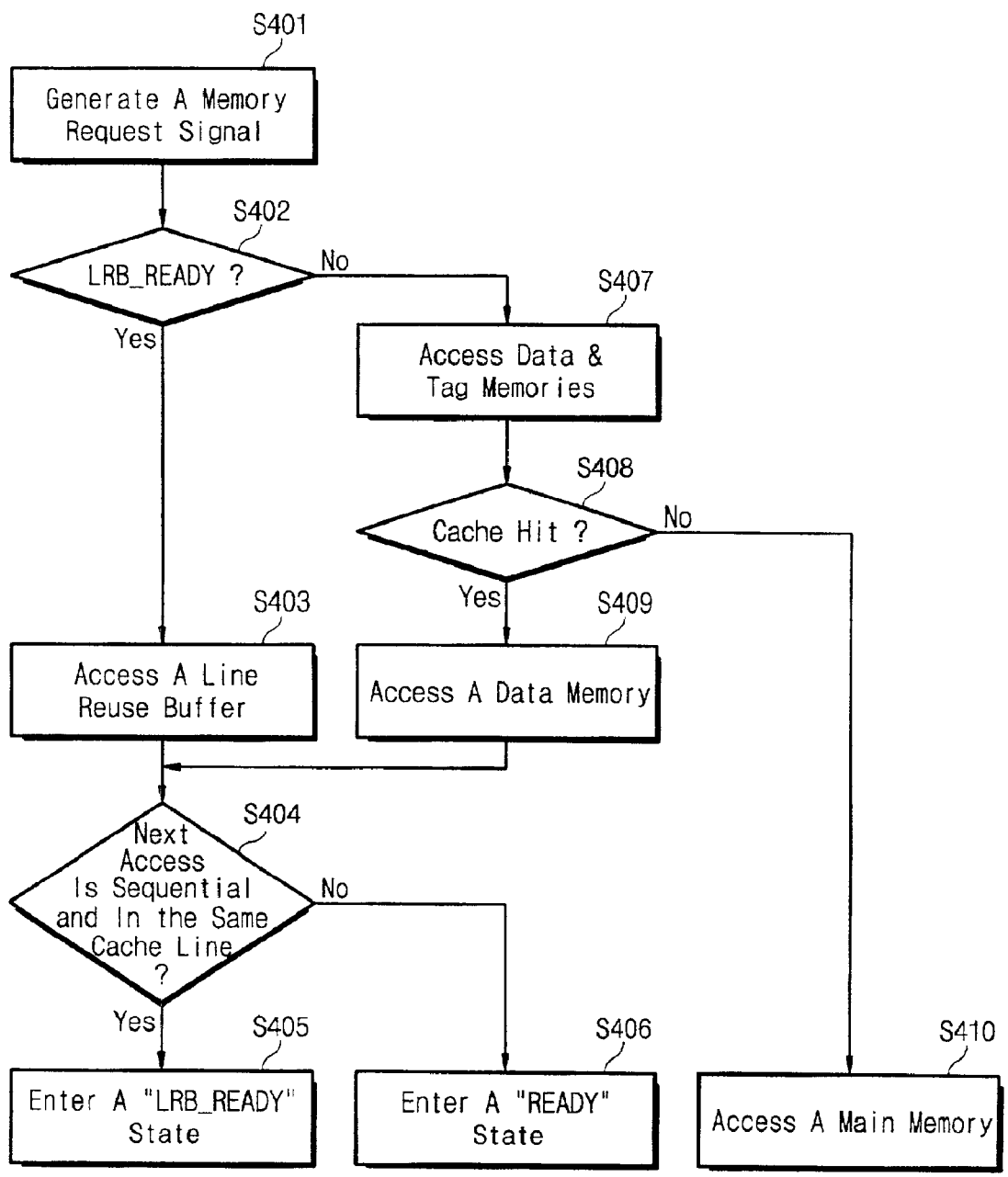
FIG. 5 is a flowchart describing a memory request processing method according to the present invention.

FIG. 5 is a flow chart for describing a method of processing memory request of an execution engine in a cache having a line reuse buffer. In step S401, the execution engine generates a memory request signal for requesting an instruction or data needed in a next cycle to a main memory. If memory request occurs, in step S402 it is determined whether the cache controller 202 is in a "LRB_READY" state. If the cache controller is in the "LRB_READY" state, the cache controller 202 controls a data path so that data may be transferred from the line reuse buffer 201 to the execution engine. That is, data in a line reuse buffer 201 is fetched without accessing data and tag memories 101 and 103 in the cache.

In step S402, if the cache controller is not in the "LRB_READY" state, that is, the cache controller is in a "READY" state, the data and tag memories 101 and 103 are in step S407 accessed using the memory request signal, which includes a fetch address being information of a memory position where required data is stored. As above described in connection with FIGS. 2 and 3, the tag memory 103 is accessed using an X-bit index of an N-bit fetch address, and the accessed tag is compared with a T-bit index of the fetch address. In step S408, it is checked whether a cache hit occurs or not. The cache hit occurs when the comparison result indicates that data requested by the execution engine is stored in the data memory 101. The cache controller 202 controls the data path so that data accessed from the data memory 101 may be transferred to the execution engine, which is carried out in step S409.

After data requested by the execution engine is transferred, there is determined a next state of the cache controller. That is, it is checked in step S404 whether the next access is a sequential fetch and related to a presently accessed cache line (or the same cache line). If the next access is the sequential fetch and related to the same cache line, in step S405, the next state of the cache controller 202 becomes the "LRB_READY" state. If the next access is not the sequential fetch or is not related to the same cache line, in step S406, the next state of the cache controller 202 becomes the "READY" state for the general cache access.

Returning to the S408, if no cache hit occurs, a main memory is accessed in a well-known manner, and the cache controller 202 controls the data path so that data may be transferred to the execution engine and stored in the data memory 101. At this time, tag ones of fetch address bits used for accessing the main memory are stored in the tag memory 103. Data of a cache line unit fetched from the main memory is stored in the line reuse buffer 201 at the same time.

In the case that the line reuse buffer 201 is accessed to fetch the required data, the data and tag memories 101 and 103 enter the low-power stand-by mode. That is, the data and tag memories 101 and 103 are suspended or disabled. Disabling of the data and tag memories 101 and 103 can be accomplished using a different method from the above-described method. For example, in the case where the data and tag memories 101 and 103 are realized using a synchronous memory, a low-power stand-by mode of each of the data and tag memories 101 and 103 can be accomplished by interrupting a clock signal supplied to the data and tag memories 101 and 103.

Figure 6:
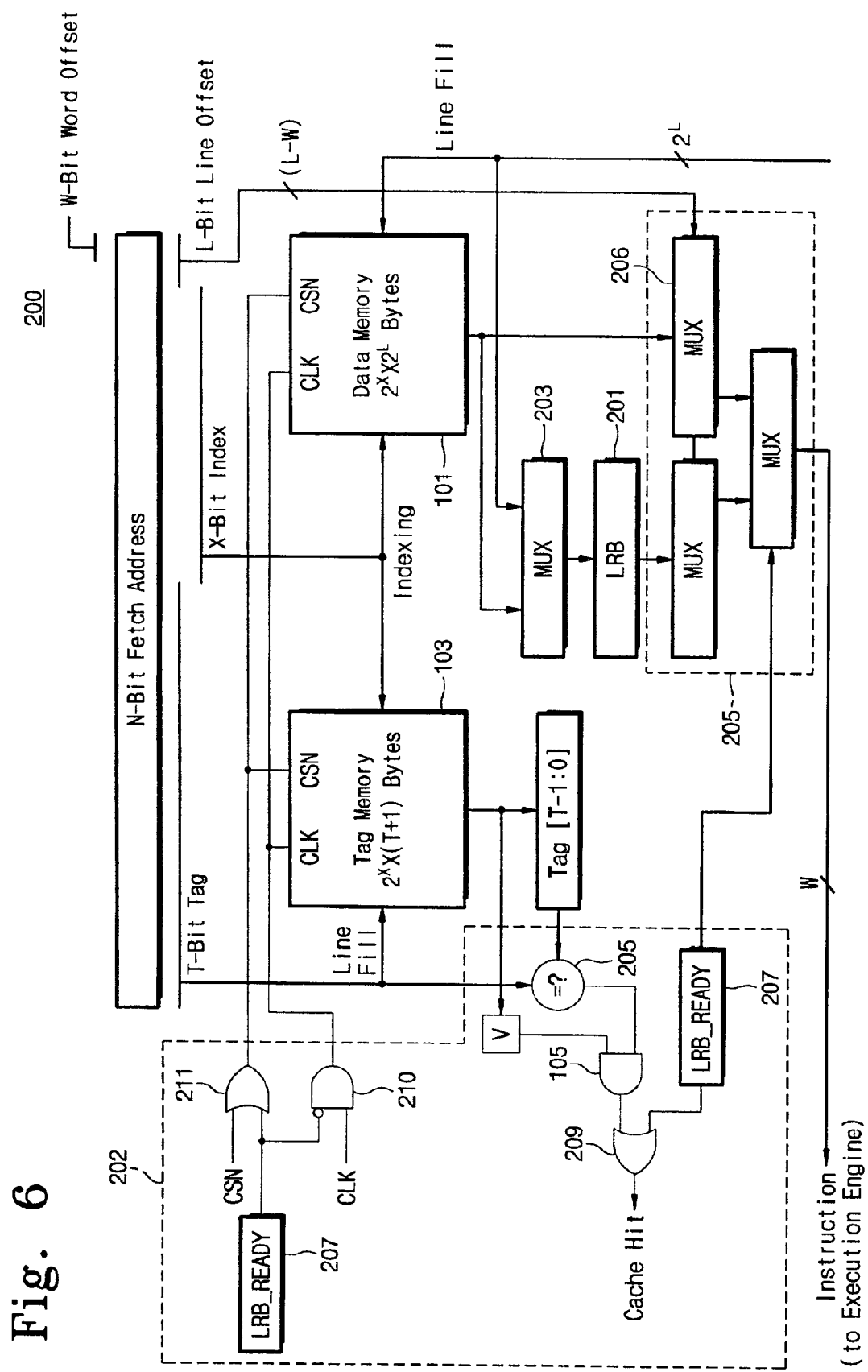
FIG. 6 is one modified embodiment of a cache illustrated in FIG. 3.

Referring to FIG. 6, when the state indication section 207 has logically '0', an output of an AND gate 210 is determined according to the clock signal CLK. When the state indication section 207 is logical '1', the output of the AND gate 210 becomes low regardless of transition of the clock signal CLK. This makes the data and tag memories 101 and 103 enter the low-power stand-by mode. In FIG. 6, either one of the CSN and CLK signals can be used to disable the data and tag memories 101 and 103. On the other hand, all CSN and CLK signals can be used to disable the data and tag memories 101 and 103. A cache in FIG. 6 is identical with that in FIG. 3 except for a method of disabling the data and tag memories 101 and 103, and description thereof is thus omitted.

Figure 7:
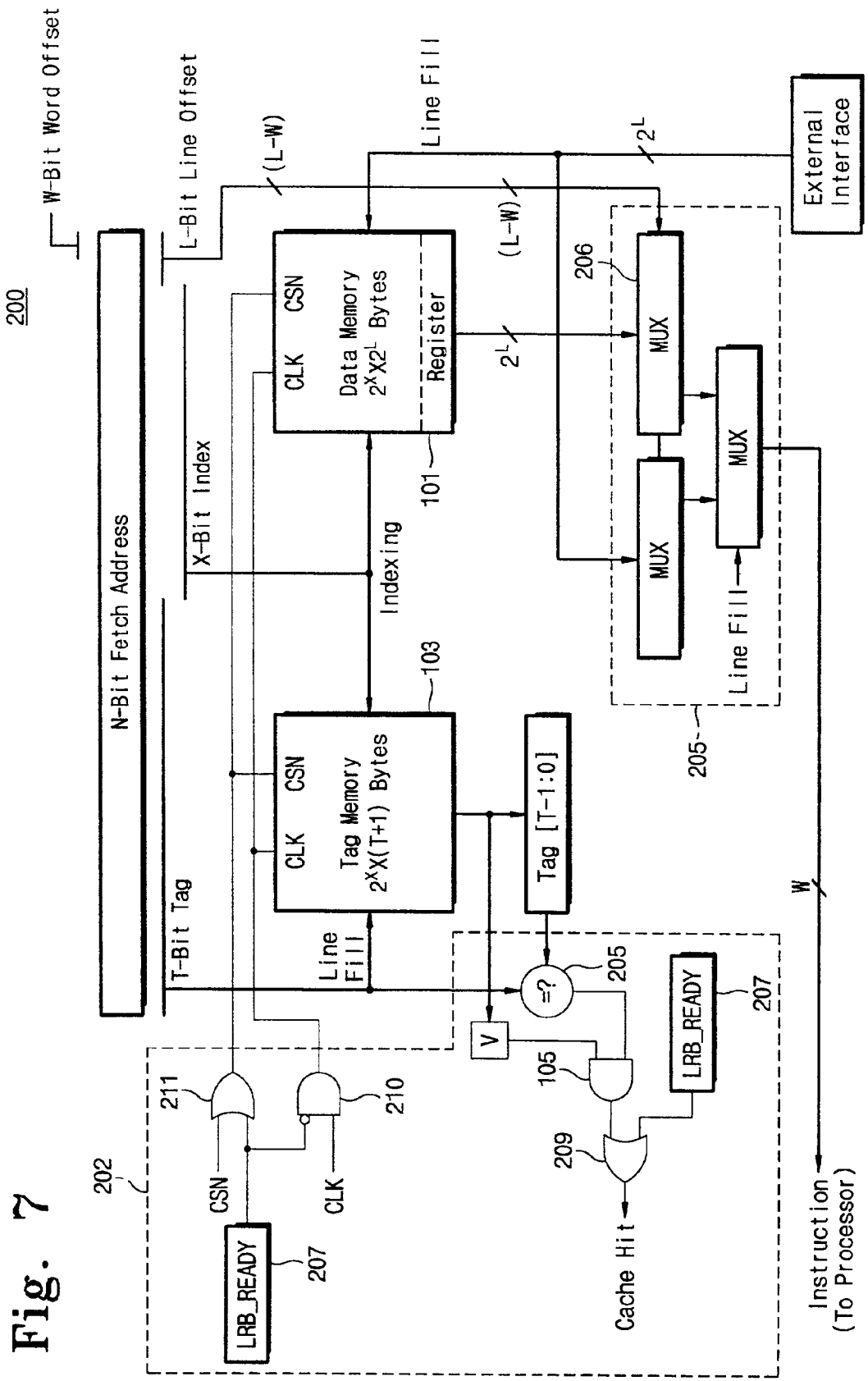
FIG. 7 is another modified embodiment of a cache illustrated in FIG. 3.

In the case where the data memory 101 is realized using a latch memory, as illustrated in FIG. 7, a low-power stand-by mode can be accomplished without using the line reuse buffer. The latch memory temporarily stores previously accessed data using a register or a buffer therein although entering the stand-by mode. Therefore, when the data and tag memories 101 and 103 enter the low-power stand-by mode, required data is fetched from the register in the data memory through a data path controlled by the cache controller. The cache in FIG. 7 is identical with those in FIGS. 3 and 6, and description thereof is thus omitted.

Since a total capacity of the data and tag memories is 10 KB to 70 KB, for example, and the line reuse buffer or the register of the data memory is 8 B to 64 B, for example, power consumed when accessing the line reuse buffer or the register is considerably low as compared with that consumed when accessing the data and tag memories. Therefore, since the frequency of providing data to the execution engine through the line reuse buffer or the register of the data memory mounts up to about 70 to 80%, reduction of power dissipation is considerable.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A microprocessor comprising:
   an execution engine for generating a memory request signal and a sequential fetch signal, wherein: (i) the memory request signal requests data fetch from a main memory and includes information related to position in the main memory of data requested according to the memory request signal; and (ii) the sequential fetch signal is generated when the requested data is stored at a position of the main memory adjacent to data used immediately previously by the execution engine; and
   a cache including a cache controller having a state indication section for indicating the state of the cache controller, a data memory for storing data of the main memory by a cache line unit including plural words, a tag memory for storing a tag corresponding to position information related to the main memory of data stored in the data memory, a register for temporarily storing data transferred from the main memory in a cache miss processing cycle, and a data path for interconnecting the data memory and the execution engine, wherein
   when the execution engine generates the sequential fetch signal and the requested data is stored in the same cache line of the data memory as the data used immediately previously by the execution engine,
   the data and tag memories enter a low-power stand-by mode, and the requested data is transferred from the register to the execution engine, and wherein
   the cache controller generates a first signal and a second signal, the first signal generated in response to the state indication section and a chip selection signal, and the second signal generated in response to the state indication section and a clock signal, and
   the data and tag memories each have a chip selection input and a clock input, wherein the data and tag memories enter the low-power stand-by mode in response to the first signal and second signal output to the chip selection input and clock input, respectively.

2. The microprocessor according to claim 1, wherein the data memory and the register constitute a latch memory.

3. The microprocessor according to claim 1, wherein the cache is one of a data cache and an instruction cache.

4. The microprocessor according to claim 1, wherein the register comprises a line reuse buffer that stores data stored in the same cache line of the data memory as the data used immediately previously by the execution engine.

5. The microprocessor according to claim 1, wherein when the state indication section is in a second logical state, contents of a new cache line are transferred to the execution engine and simultaneously stored in the register.

6. A microprocessor comprising:
   an execution engine for generating a memory request signal and a sequential fetch signal, wherein: (i) the memory request signal requests data fetch from a main memory and includes information related to position in the main memory of data requested according to the memory request signal; and (ii) the sequential fetch signal is generated when the requested data is stored at a position of the main memory adjacent to data used immediately previously by the execution engine; and
   a cache including a cache controller having a state indication section for indicating the state of the cache controller, a data memory for storing data of the main memory by a cache line unit consisting of plural words, a tag memory for storing a tag corresponding to position information, related to the main memory, of data stored in the data memory, a line reuse buffer for storing data stored in the same cache line of the data memory in a previous access cycle as the data used immediately previously by the execution engine in the event of a cache hit, and for storing data transferred from the main memory in the event of a cache miss processing cycle, and a data path for interconnecting the data memory, the execution engine, and the line reuse buffer, wherein
   when the execution engine generates the sequential fetch signal and the requested data is stored in the same cache line of the data memory as the data used immediately previously by the execution engine,
   the data path is controlled by the cache controller so that the requested data may be transferred from the line reuse buffer to the execution engine, and the data and tag memories are controlled so as to enter a low-power stand-by mode, and wherein
   the cache controller generates a first signal and a second signal, the first signal generated in response to the state indication section and a chip selection signal, and the second signal generated in response to the state indication section and a clock signal, and
   the data and tag memories each have a chip selection input and a clock input, and the data and tag memories enter the low-power stand-by mode in response to the first signal and second signal output to the chip selection input and clock input, respectively.

7. The microprocessor according to claim 6, wherein the data path comprises a plurality of multiplexers.

8. The microprocessor according to claim 6, wherein both the data and tag memories enter the low-power stand-by mode by disabling a control signal for selecting the data and tag memories.

9. The microprocessor according to claim 6, wherein both the data and tag memories enter the low-power stand mode in response to the second signal having a logic low state supplied to the data and tag memories.

10. The microprocessor according to claim 6, wherein the cache is one of a data cache and an instruction cache.

11. The microprocessor according to claim 6, wherein when a new cache line of the data memory is accessed or when a new cache line is filled in the data memory after the cache miss, data of the new cache line is stored in the line reuse buffer.

12. The microprocessor according to claim 6, wherein when the data requested according to the memory request signal is not stored in the data memory, the cache controller controls the data path so that the requested data may be transferred from the main memory to the execution.

13. The microprocessor according to claim 12, wherein the cache controller controls the data path so that the requested data may be transferred from the main memory to the data memory.

14. The microprocessor according to claim 6, wherein in case that the requested data is stored in the data memory and is valid and that the execution engine does not output the sequential fetch signal or the requested data is not stored in the same cache line of the data memory as the data used immediately previously by the execution engine, the cache controller controls the data path so that the requested data may be transferred from the data memory to the execution engine.

15. The microprocessor according to claim 14, wherein when the requested data is stored in the data memory is invalid, the cache controller controls the data path so that the requested data may be transferred from the main memory to the execution engine.

16. The microprocessor according to claim 6, wherein whether the requested data is stored in the same cache line of the data memory as the data used immediately previously by the execution engine is determined by a position on a cache line including the immediately previously used data and a length of the cache line.

17. The microprocessor according to claim 6, wherein the cache uses a direct mapping method.

18. The microprocessor according to claim 6, wherein the cache uses a fully associative method.

19. The microprocessor according to claim 6, wherein the cache uses a set associative method.

20. The microprocessor according to claim 6, wherein when the state indication section is in a second logical state, contents of a new cache line are transferred to the execution engine and simultaneously stored in the line reuse buffer.

21. A microprocessor system comprising:
a main memory for storing data, wherein the stored data is characterized by corresponding position information;
an execution engine for generating a memory request signal and a sequential fetch signal, wherein: (i) the memory request signal requests data fetch from a main memory and includes information related to position in the main memory of data requested according to the memory request signal; and (ii) the sequential fetch signal is generated when the requested data is stored at a position of the main memory adjacent to data used immediately previously by the execution engine; and
a cache including a cache controller having a state indication section for indicating the state of the cache controller, a data memory for storing data of the main memory by a cache line unit consisting of plural words, a tag memory for storing a tag corresponding to position information, related to the main memory, of data stored in the data memory, a line reuse buffer for storing data stored in the same cache line of the data memory in a previous access cycle as the data used immediately previously by the execution engine in the event of a cache hit and for storing data transferred from the main memory in the event of a cache miss processing cycle, and a data path for interconnecting the data memory, the execution engine, and the line reuse buffer; wherein
the line reuse buffer is accessed when the execution engine in an access cycle generates the sequential fetch signal and the requested data is stored in the same cache line of the data memory as the data used immediately previously by the execution engine, and the requested data may be transferred from the line reuse buffer to the execution engine in response to the cache controller controlling the data path; wherein
when the cache controller controls the data path so that the requested data may be transferred from the line reuse buffer to the execution engine, the data and tag memories are controlled so as to enter a low-power stand-by mode in response to the state indication section in the first logical state, and wherein
the cache controller generates a first signal and a second signal, the first signal generated in response to the state indication section and a chip selection signal, and the second signal generated in response to the state indication section and a clock signal, and
the data and tag memories each have a chip selection input and a clock input, and the data and tag memories enter the low-power stand-by mode in response to the first signal and second signal output to the chip selection input and clock input, respectively.

22. The microprocessor system according to claim 21, wherein the data path comprises a plurality of multiplexers.

23. The microprocessor system according to claim 21, wherein the data and tag memories enter the low-power stand-by mode in response to the first signal having a logic high state or the second signal having a logic low state supplied to both the data and tag memories.

24. The microprocessor system according to claim 21, wherein the data and tag memories enter the low-power stand-by mode in response to the second signal having a logic low state supplied to both the data and tag memories.

25. The microprocessor system according to claim 21, wherein the cache is one of a data cache and an instruction cache.

26. The microprocessor system according to claim 21, wherein when a new cache line of the data memory is accessed or when a new cache line is filled in the data memory after the cache miss, data of the new cache line is stored in the line reuse buffer.

27. The microprocessor system according to claim 21, wherein when the data requested according to the memory request signal is not stored in the data memory, the cache controller controls the data path so that the requested data may be transferred from the main memory to the execution engine.

28. The microprocessor system according to claim 27, wherein the cache controller controls the data path so that the requested data may be transferred from the main memory to the data memory.

29. The microprocessor system according to claim 21, wherein in case that the requested data is stored in the data memory and is valid and that the execution engine does not output the sequential fetch signal or the requested data is not stored in the same cache line of the data memory as the data used just previously by the execution engine, the cache controller controls the data path so that the requested data may be transferred from the data memory to the execution engine.

30. The microprocessor system according to claim 29, wherein when the requested data is stored in the data memory is invalid, the cache controller controls the data path so that the requested data may be transferred from the main memory to the execution engine.

31. The microprocessor system according to claim 21, wherein whether the requested data is stored in the same cache line of the data memory as the data used immediately previously by the execution engine is determined by a position on a cache line including the just previously used data and a length of the cache line.

32. A microprocessor comprising:
an execution engine for generating a memory request signal and a sequential fetch signal, wherein: (i) the memory request signal requests data fetch from a main memory and includes information related to position in the main memory of data requested according to the memory request signal; and (ii) the sequential fetch signal is generated when the requested data is stored at a position of the main memory adjacent to data that is used immediately previously by the execution engine; and
a cache including a cache controller having a state indication section for indicating the state of the cache controller, a data memory for storing data of the main memory by a cache line unit including plural words, a tag memory for storing a tag corresponding to position information related to the main memory of data stored in the data memory, a line reuse buffer for storing data transferred from the main memory in the event of a cache miss processing cycle, and a data path for interconnecting the data memory, the execution engine, and the line reuse buffer, wherein
the requested data may be transferred from the line reuse buffer to the execution engine and both the data and tag memories enter a low-power stand-by mode in response to the state indication in the first logical state, and wherein the cache controller generates a first signal and a second signal, the first signal generated in response to the state indication section and a chip selection signal, the second signal is generated in response to the state indication section and a clock signal, and
the data and tag memories each have a chip selection input and a clock input, and the data and tag memories enter the low-power stand-by mode in response to the first signal and second signal output to the chip selection input and clock input, respectively.

33. A microprocessor comprising:
an execution engine for generating a memory request signal and a sequential fetch signal, wherein: (i) the memory request signal requests data fetch from a main memory and includes information related to position in the main memory of data requested according to the memory request signal; and (ii) the sequential fetch signal is generated when the requested data is stored at a position of the main memory adjacent to data that is used immediately previously by the execution engine; and
a cache including a cache controller having a state indication section for indicating the state of the cache controller; a data memory for storing data of the main memory by a cache line unit consisting of plural words, a tag memory for storing a tag corresponding to position information related to the main memory of data stored in the data memory, a line reuse buffer for storing data stored in the same cache line of the data memory as the data used immediately previously by the execution engine, and a data path for interconnecting the data memory, the execution engine, and the line reuse buffer; wherein
when the execution engine generates the sequential fetch signal and the requested data is stored in the same cache line of the data memory as the data used immediately previously by the execution engine, the data and tag memories are controlled so as to enter a low-power stand-by; wherein
when a new cache line of the data memory is accessed or a new cache line is filled in the data memory after the cache miss, the cache controller controls the data path so that data of the new cache line may be stored in the line reuse buffer, and wherein the cache controller generates a first signal and a second signal, the first signal generated in response to the state indication section and a chip selection signal, and the second signal generated in response to the state indication section and a clock signal, and
the data and tag memories each have a chip selection input and a clock input, and the data and tag memories enter the low-power stand-by mode in response to the first signal and second signal output to the chip selection input and clock input, respectively.

34. In a microprocessor comprising an execution engine, a cache having a cache memory for storing data of a main memory by a cache line unit having plural words; wherein the cache includes a cache controller having a state indication section for indicating the state of the cache controller, and a line reuse buffer for storing data stored in the same cache line of the data memory as the data used immediately previously by the execution engine in the event of a cache hit, and for temporarily storing data transferred from the main memory in the event of a cache miss, a method of processing memory requests with regard to the main memory comprising the steps of:
generating a sequential fetch signal when data requested by the memory request is stored at a position of the main memory adjacent to data that is used immediately previously by the execution engine;
confirming, when the sequential fetch signal is generated, whether the requested data is stored in the same cache line of the cache in a previous access cycle as the immediately previously used data;
fetching the requested data from the line reuse buffer when the requested data is stored in the same cache line of the cache as the immediately previously used data; and
transferring the fetched data to the execution engine; and
putting the cache memory into a low-power stand-by mode in response to a first signal and a second signal generated by the cache controller, wherein the first signal is generated in response to the state indication section and a chip selection signal and received by a chip selection input of the cache memory, and the second signal is generated in response to the state indication section and a clock signal and received by a clock input of the cache memory.

35. The method according to claim 34, further comprising the step of controlling the cache so as to enter low-power stand-by mode when the requested data is fetched from the line reuse buffer.

36. The method according to claim 34, wherein the cache is one of a data cache and an instruction cache.

37. The method according to claim 34, wherein when a new cache line of the data memory is accessed or when a new cache line is filled in the data memory after the cache miss, data of the new cache line is stored in the line reuse buffer.

38. The method according to claim 34, further comprising the step of fetching the requested data from the main memory when the data requested according to the memory request signal is not stored in the data memory.

39. The method according to claim 34, further comprising the step of fetching the requested data from the cache, in case that the requested data is stored in the data memory and is valid and that the execution engine does not output the sequential fetch signal or the requested data is not stored in the same cache line of the data memory as the data used immediately previously by the execution engine.

40. The method according to claim 39, further comprising the step of fetching the requested data from the main memory when the requested data is stored in the data memory is invalid.

41. The method according to claim 34, wherein whether the requested data is stored in the same cache line of the data memory as the data used immediately previously by the execution engine is determined by a position on a cache line including the immediately previously used data and a length of the cache line.

* * * * *

UNITED STATES PATENT AND TRADEMARK OFFICE
CERTIFICATE OF CORRECTION

PATENT NO. : 6,934,811 B2  
DATED : August 23, 2005  
INVENTOR(S) : Sang-Yeun Cho Page 1 of 1

It is certified that error appears in the above-identified patent and that said Letters Patent is hereby corrected as shown below:

Column 8,
Line 58, please delete "stand" and insert -- stand-by --.

Column 9,
Line 5, please insert -- engine -- after "execution".

Signed and Sealed this

Sixth Day of December, 2005

JON W. DUDAS
*Director of the United States Patent and Trademark Office*